(12) United States Patent
Maruyama et al.

(10) Patent No.: US 9,815,367 B2
(45) Date of Patent: Nov. 14, 2017

(54) PEDAL REACTION FORCE APPLYING DEVICE

(71) Applicant: HONDA MOTOR CO., LTD., Tokyo (JP)

(72) Inventors: Kohei Maruyama, Wako (JP); Toshiaki Arai, Wako (JP); Yoshikazu Sato, Wako (JP); Hideto Nebuya, Wako (JP); Go Suzaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/138,959

(22) Filed: Apr. 26, 2016

(65) Prior Publication Data
US 2016/0311321 A1    Oct. 27, 2016

(30) Foreign Application Priority Data
Apr. 27, 2015  (JP) .................................. 2015-090272

(51) Int. Cl.
*B60K 26/02* (2006.01)
*B60W 50/16* (2012.01)
(Continued)

(52) U.S. Cl.
CPC ........... *B60K 26/021* (2013.01); *B60W 50/16* (2013.01); *B60K 2026/022* (2013.01);
(Continued)

(58) Field of Classification Search
CPC ........ B60K 2026/022; B60K 2026/023; B60K 26/021; B60W 50/16; F02D 11/02; G05G 5/03
(Continued)

(56) References Cited

U.S. PATENT DOCUMENTS 6,920,385 B2 *  7/2005  Egami ................ B60K 31/0008
                                                    701/70
8,521,360 B2 *  8/2013  Yamazaki ............ B60K 26/021
                                                    701/36
(Continued)

FOREIGN PATENT DOCUMENTS

JP    2004-183633 A    7/2004
JP    2007-30875 A     2/2007
(Continued)

OTHER PUBLICATIONS

Office Action dated Jan. 31, 2017, issued in counterpart Japanese Patent Application No. 2015-090272, with machine translation. (9 pages).

*Primary Examiner* — Tyler J Lee
(74) *Attorney, Agent, or Firm* — Westerman, Hattori, Daniels & Adrian, LLP

(57) ABSTRACT

A pedal reaction force applying device includes an acceleration pedal used in a stepping-in operation and a returning operation, a motor configured to apply a pedal reaction force acting on an acceleration pedal in the stepping-in operation and the returning operation, a power transmitting device provided between the acceleration pedal and the motor and including a speed-reduction mechanism, an operation direction determiner configured to determine an operation direction of the acceleration pedal, and a reaction force controller configured to control the pedal reaction force on the acceleration pedal. The reaction force controller controls a magnitude of the pedal reaction force by controlling a power of the motor based on the operation direction of the acceleration pedal determined by the operation direction determiner.

9 Claims, 9 Drawing Sheets

(51) Int. Cl.
*F02D 11/02* (2006.01)
*G05G 5/03* (2008.04)

(52) U.S. Cl.
CPC ........ *B60K 2026/023* (2013.01); *F02D 11/02* (2013.01); *G05G 5/03* (2013.01)

(58) Field of Classification Search
USPC .................................................... 701/36, 70
See application file for complete search history.

(56) References Cited

U.S. PATENT DOCUMENTS

| | | | | |
|---|---|---|---|---|
| 8,738,261 | B2* | 5/2014 | Yamazaki | B60K 26/021 |
| | | | | 701/70 |
| 9,229,469 | B2* | 1/2016 | Maruyama | G05G 1/30 |
| 2010/0083789 | A1* | 4/2010 | Osawa | B60K 26/02 |
| | | | | 74/513 |
| 2010/0299037 | A1* | 11/2010 | Sakaguchi | B60K 26/021 |
| | | | | 701/70 |
| 2011/0087414 | A1* | 4/2011 | Shiomi | B60K 26/021 |
| | | | | 701/70 |
| 2012/0109481 | A1* | 5/2012 | Mitsuyasu | B60L 11/14 |
| | | | | 701/70 |
| 2012/0216652 | A1* | 8/2012 | Yamazaki | B60K 26/021 |
| | | | | 74/513 |

FOREIGN PATENT DOCUMENTS

| | | |
|---|---|---|
| JP | 2008-150021 A | 7/2008 |
| WO | 2013/175680 A1 | 11/2013 |
| WO | 2015/049823 A1 | 4/2015 |

* cited by examiner

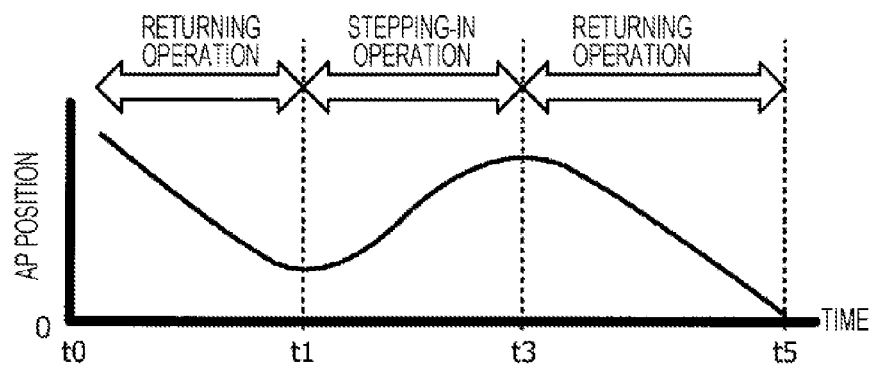
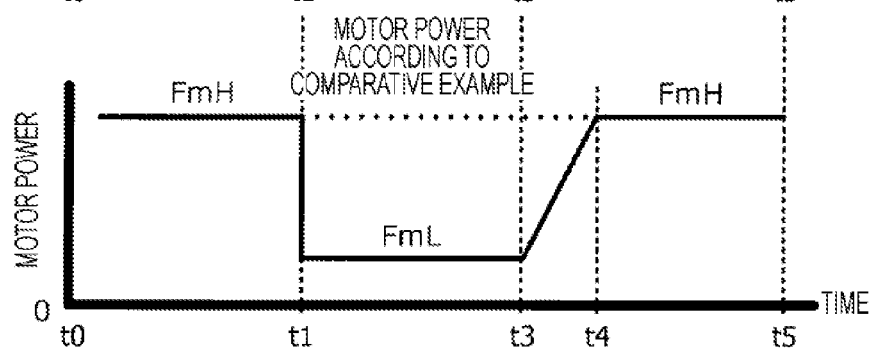
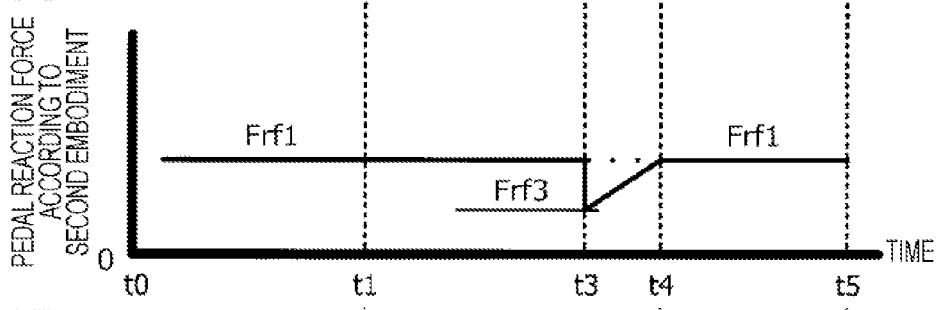
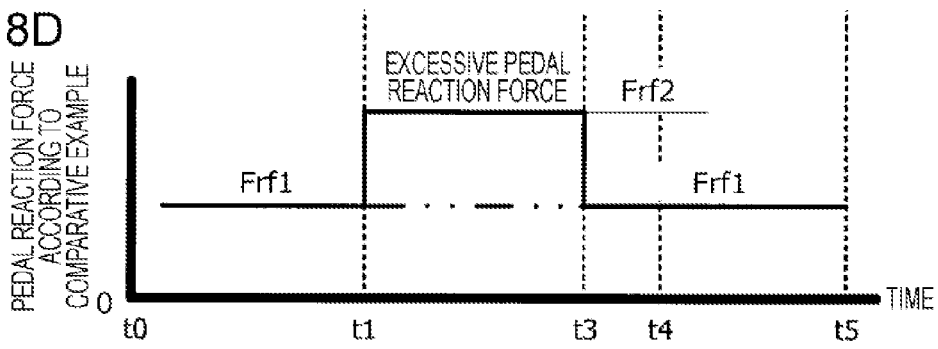

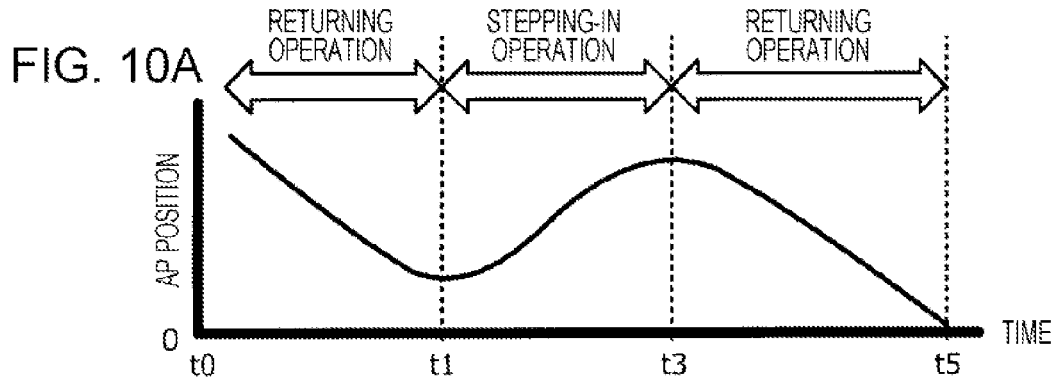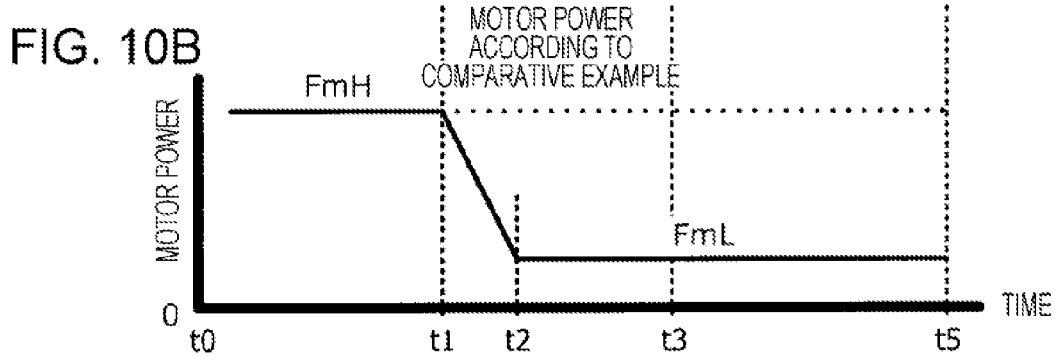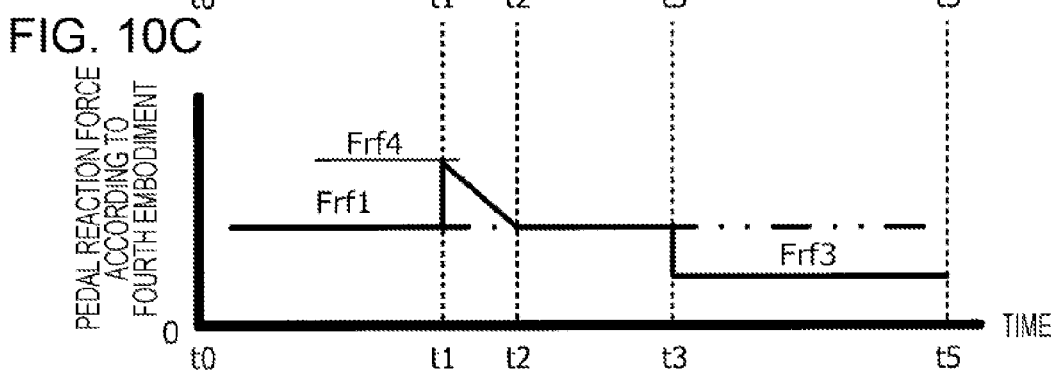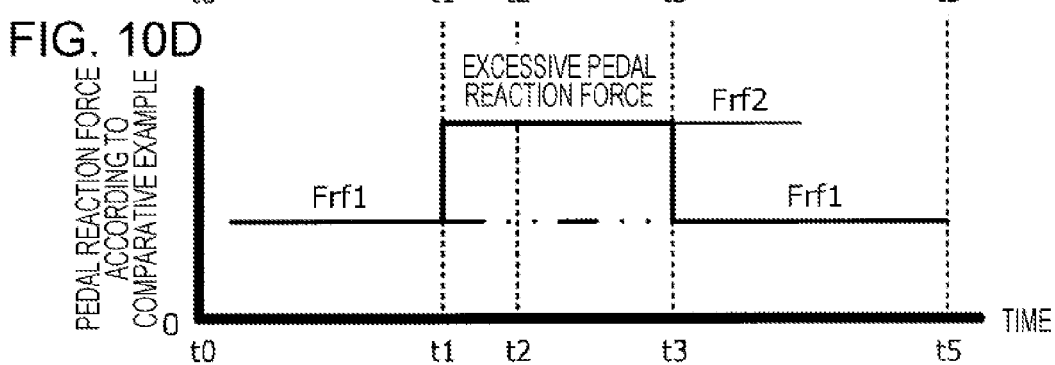

PEDAL REACTION FORCE APPLYING DEVICE

CROSS REFERENCES TO RELATED APPLICATIONS

The present application claims priority under 35 U.S.C. §119 to Japanese Patent Application No. 2015-090272, filed Apr. 27, 2015, entitled "Pedal Reaction Force Applying Device." The contents of this application are incorporated herein by reference in their entirety.

BACKGROUND

1. Field

The present disclosure relates to a pedal reaction force applying device that applies a reaction force to a pedal operation by a driver of a vehicle.

2. Description of the Related Art

Conventionally developed techniques apply the reaction force to the pedal operation by the driver of the vehicle so as to assist the driving of the vehicle. Japanese Unexamined Patent Application Publication No. 2008-150021 discloses an example of such a pedal reaction force applying technique including an acceleration pedal and a pedal reaction force control unit that outputs a control signal for controlling the reaction force to an operation of the acceleration pedal. According to this technique, when the vehicle speed exceeds a speed limit, a power of an actuator is transmitted to the acceleration pedal through a power transmitting device including a speed-reduction mechanism.

The pedal reaction force applying technique according to Japanese Unexamined Patent Application Publication No. 2008-150021 is capable of applying the reaction force to the acceleration pedal when the vehicle speed exceeds the speed limit to warn the driver about the vehicle speed exceeding the speed limit.

In the pedal reaction force applying technique according to Japanese Unexamined Patent Application Publication No. 2008-150021, any attempt to cause the power of the actuator to act onto a pedal member through the power transmitting device including the speed-reduction mechanism may potentially cause discomfort in a pedal operation feeling of the driver in both of a stepping-in operation and a returning operation of the pedal.

SUMMARY

The present disclosure provides a pedal reaction force applying device capable of providing a comfortable pedal operation feeling to a driver irrespective of an operation direction of a pedal member.

The inventors have conducted investigation and research on a factor that causes the discomfort in the pedal operation feeling of the driver in the attempt to cause the power of the actuator (a motive power generated by the actuator) to act onto the pedal member through the power transmitting device including the speed-reduction mechanism in both of the stepping-in operation and the returning operation of the pedal member.

In the investigation and research, the inventors found that, for the same power of the actuator, the magnitude of a pedal reaction force, which is the reaction force acting on the pedal member, differs between the stepping-in operation and the returning operation of the pedal member. The inventors discovered that this is because the power transmitting efficiency (hereinafter, simply referred to as "efficiency"; the efficiency is less than one) of the power transmitting device including the speed-reduction mechanism is applied as division and multiplication in formulae (refer to Equation 1 and Equation 2) for calculating the magnitude of the pedal reaction force, differently between the stepping-in operation and the returning operation of the pedal member.

$$\text{Pedal Reaction Force in Stepping-in operation} = \text{Power of Actuator} * \text{Speed Reduction Ratio} / \text{Efficiency} \quad (1)$$

$$\text{Pedal Reaction Force in Returning operation} = \text{Power of Actuator} * \text{Speed Reduction Ratio} * \text{Efficiency} \quad (2)$$

The inventors carried out research on how to reduce a difference in the magnitude of the pedal reaction force between the stepping-in operation and the returning operation of the pedal member to provide a comfortable pedal operation feeling to the driver irrespective of the operation direction of the pedal member, thereby achieving the present disclosure.

Specifically, a first aspect of the disclosure includes, as a primary feature, a pedal member provided to a vehicle and used in a stepping-in operation and a returning operation, an actuator configured to apply a pedal reaction force acting on the pedal member in the stepping-in operation and the returning operation of the pedal member, a power transmitting device provided between the pedal member and the actuator and including a speed-reduction mechanism configured to transmit a power of the actuator to the pedal member, an operation direction determiner configured to determine an operation direction of the pedal member, and a reaction force controller configured to control the pedal reaction force. The reaction force controller controls a magnitude of the pedal reaction force by controlling the power of the actuator based on the operation direction of the pedal member determined by the operation direction determiner.

The operation direction determiner may be configured to determine the operation direction of the pedal member with reference to, for example, a temporal change characteristic related to the operation amount of the pedal member, and a temporal change characteristic related to the drive direction of the actuator.

In the first aspect of the disclosure, the reaction force controller controls the magnitude of the pedal reaction force acting on the pedal member by controlling the power of the actuator based on the operation direction of the pedal member determined by the operation direction determiner, thereby achieving a reduced difference in the magnitude of the pedal reaction force between the stepping-in operation and the returning operation of the pedal member.

The first aspect of the disclosure can provide a comfortable pedal operation feeling to a driver irrespective of the operation direction of the pedal member.

A second aspect of the disclosure is the pedal reaction force applying device according to the first aspect of the disclosure, characterized in that the reaction force controller controls the power of the actuator such that the power of the actuator becomes larger when the operation direction of the pedal member is in a returning direction than when the operation direction of the pedal member is in a stepping-in direction.

In the second aspect of the disclosure, the reaction force controller controls the power of the actuator to be larger when the operation direction of the pedal member is in the returning direction than when the operation direction of the pedal member is in the stepping-in direction. This can achieve a reduced difference in the magnitude of the pedal reaction force between the stepping-in operation and the returning operation of the pedal member.

Similarly to the first aspect of the disclosure, the second aspect of the disclosure can provide a comfortable pedal operation feeling to the driver irrespective of the operation direction of the pedal member.

A third aspect of the disclosure is the pedal reaction force applying device according to the first or second aspect of the disclosure, characterized in that: the reaction force controller may set a stepping-in direction power as the power of the actuator when the operation direction of the pedal member is in a stepping-in direction, and a returning direction power having a magnitude different from a magnitude of the stepping-in direction power as the power of the actuator when the operation direction of the pedal member is in a returning direction; and the reaction force controller may perform switching from the returning direction power to the stepping-in direction power when the operation direction of the pedal member changes from the returning direction to the stepping-in direction, whereas the reaction force controller may more gradually perform switching from the stepping-in direction power to the returning direction power than the switching from the returning direction power to the stepping-in direction power when the operation direction of the pedal member changes from the stepping-in direction to the returning direction.

In the third aspect of the disclosure, when the operation direction of the pedal member changes from the returning direction to the stepping-in direction, the switching from the returning direction power to the stepping-in direction power is relatively immediately performed because the driver intends to step the pedal member in. This can prevent any remaining returning direction power from encumbering the stepping-in operation of the pedal member by the driver. When the operation direction of the pedal member changes from the stepping-in direction to the returning direction, any switching involving an abrupt increase in the reaction force may potentially cause discomfort to the driver. For this reason, the switching from the stepping-in direction power to the returning direction power is more gradually performed than the switching from the returning direction power to the stepping-in direction power. This allows a smooth increase of the pedal reaction force.

Similarly to the first or second aspect of the disclosure, the third aspect of the disclosure can provide a comfortable pedal operation feeling to the driver irrespective of the operation direction of the pedal member.

A fourth aspect of the disclosure is the pedal reaction force applying device according to the first or second aspect of the disclosure, characterized in that: the reaction force controller may set a stepping-in direction power as the power of the actuator when the operation direction of the pedal member is in a stepping-in direction, and a returning direction power having a magnitude different from a magnitude of the stepping-in direction power as the power of the actuator when the operation direction of the pedal member is in a returning direction; and the reaction force controller may perform switching from the returning direction power to the stepping-in direction power when the operation direction of the pedal member changes from the returning direction to the stepping-in direction, whereas the reaction force controller may maintain, when the operation direction of the pedal member changes from the stepping-in direction to the returning direction, the stepping-in direction power until a predetermined initialization condition is established after the change.

In the fourth aspect of the disclosure, the power of the actuator is switched from the returning direction power to the stepping-in direction power when the operation direction of the pedal member changes from the returning direction to the stepping-in direction.

When the operation direction of the pedal member changes from the stepping-in direction to the returning direction, the stepping-in direction power is maintained until the predetermined initialization condition is established after the change. Thus, for example, when the driver abruptly changes the operation direction from the stepping-in operation to the returning operation but the reaction force controller fails to acquire a process of this abrupt change, the reaction force controller still prevents an increase in the reaction force due to delayed switching to the returning direction power from the stepping-in direction power that provides a smaller reaction force, even though the operation has already been performed in the returning direction, thereby achieving a reduction in discomfort caused to the driver.

Similarly to the first or second aspect of the disclosure, the fourth aspect of the disclosure can provide a comfortable pedal operation feeling to the driver irrespective of the operation direction of the pedal member.

A fifth aspect of the disclosure is the pedal reaction force applying device according to the fourth aspect of the disclosure, characterized in that the reaction force controller may gradually perform the switching from the returning direction power to the stepping-in direction power when the operation direction of the pedal member changes from the returning direction to the stepping-in direction.

In the fifth aspect of the disclosure, the switching from the returning direction power to the stepping-in direction power is gradually performed when the operation direction of the pedal member changes from the returning direction to the stepping-in direction. This prevents an abrupt change in the reaction force even when, for example, the driver repeats the stepping-in operation and the returning operation to maintain a certain operation amount of the pedal member or to perform a fine adjustment of the operation amount, thereby achieving a reduction in discomfort caused to the driver.

Similarly to the first or second aspect of the disclosure, the fifth aspect of the disclosure can provide a comfortable pedal operation feeling to the driver irrespective of the operation direction of the pedal member.

A sixth aspect of the disclosure is the pedal reaction force applying device according to the fourth aspect of the disclosure, further including an original position determiner configured to determine whether the pedal member is returned to an original position, characterized in that the initialization condition that defines an end of a duration in which the stepping-in direction power is maintained may be established when the original position determiner determines that the pedal member is returned to a vicinity of the original position.

In the sixth aspect of the disclosure, as described above, the initialization condition that defines the end of the duration in which the stepping-in direction power is maintained is established when the original position determiner determines that the pedal member is returned to the vicinity of the original position.

The original position determiner may be configured to determine that the pedal member is returned to the vicinity of the original position, for example, when the pedal member is actually returned to the vicinity of the original position or when it is assumed so.

According to the sixth aspect of the disclosure, when the operation direction of the pedal member changes from the stepping-in direction to the returning direction, the stepping-in direction power is maintained with no switching performed from the stepping-in direction power to the returning direction power until the pedal member is determined to be returned to the vicinity of the original position after the change (until the initialization condition is established), thereby achieving a reduction in discomfort caused to the driver by the switching of the type (magnitude) of the power while the power of the actuator is controlled, so that a comfortable pedal operation feeling can be provided to the driver.

A seventh aspect of the disclosure is the pedal reaction force applying device according to any one of the first to sixth aspects of the disclosure, further including an operation amount acquirer configured to acquire an operation amount of the pedal member, characterized in that the operation direction determiner may determine the operation direction of the pedal member based on a temporal change characteristic related to the operation amount of the pedal member acquired by the operation amount acquirer.

In the seventh aspect of the disclosure, the operation direction determiner determines the operation direction of the pedal member based on the temporal change characteristic (for example, a time differential value of the operation amount) related to the operation amount of the pedal member acquired by the operation amount acquirer, thereby highly accurately determining the operation direction of the pedal member according to the operation of the pedal member. This allows the magnitude of the pedal reaction force to be controlled based on the highly accurate operation direction of the pedal member, thereby highly accurately achieving a reduced difference in the magnitude of the pedal reaction force between the stepping-in operation and the returning operation of the pedal member.

The seventh aspect of the disclosure can provide a more comfortable pedal operation feeling to the driver irrespective of the operation direction of the pedal member than the first to sixth aspects of the disclosure.

An eighth aspect of the disclosure is the pedal reaction force applying device according to any one of the first to sixth aspects of the disclosure, further including an operation amount acquirer configured to acquire an operation amount of the pedal member, characterized in that the operation direction determiner may determine that the operation direction of the pedal member is switched when a change direction of the operation amount of the pedal member acquired by the operation amount acquirer is inverted and a variation related to the operation amount of the pedal member after the inversion becomes larger than a predetermined first variation threshold.

In the eighth aspect of the disclosure, as described above, the operation direction determiner determines that the operation direction of the pedal member is switched when the change direction of the operation amount of the pedal member acquired by the operation amount acquirer is inverted and the temporal variation (variation in the operation amount per unit time) related to the operation amount of the pedal member after the inversion becomes larger than the predetermined first variation threshold.

The first variation threshold may be set to a value of the variation at which the operation direction of the pedal member can be assumed to be switched, as appropriate.

According to the eighth aspect of the disclosure, an abrupt change in the magnitude of the pedal reaction force can be prevented even when, for example, the driver frequently performs the stepping-in operation and the returning operation to maintain a certain operation amount of the pedal member or to perform a fine adjustment of the operation amount.

A ninth aspect of the disclosure is the pedal reaction force applying device according to any one of the first to sixth aspects of the disclosure, further including an operation amount acquirer configured to acquire an operation amount of the pedal member, characterized in that the operation direction determiner may determine that the operation direction of the pedal member is switched, when a temporal variation (variation in the operation amount per unit time) related to the operation amount of the pedal member acquired by the operation amount acquirer becomes less than a predetermined second variation threshold.

In the ninth aspect of the disclosure, as described above, the operation direction determiner determines that the operation direction of the pedal member is switched, when the temporal variation related to the operation amount of the pedal member acquired by the operation amount acquirer becomes less than the predetermined second variation threshold.

The second variation threshold may be set to a value of the temporal variation at which the operation direction of the pedal member can be assumed to be switched, as appropriate.

According to the ninth aspect of the disclosure, a switching point of the operation direction is predicted before actual switching of the operation direction, enabling smooth switching from one of the returning direction power and the stepping-in direction power to the other when the operation direction is switched. This can provide a comfortable pedal operation feeling to the driver.

A tenth aspect of the disclosure is the pedal reaction force applying device according to any one of the first to ninth aspects of the disclosure, characterized in that: the power transmitting device may include an actuator arm connected to the speed-reduction mechanism to transmit the power of the actuator to the pedal member, and a biasing member configured to bias the actuator arm in a direction of returning the pedal member to an original position; the power of the actuator may be set based on at least one of a traveling state and a traveling condition of the vehicle; and the reaction force controller may control the power such that the power becomes a value other than zero over a predetermined time even when a command value related to the power changes from a value other than zero to zero.

When the pedal member is returned to the original position from a position at which the stepping-in operation is performed, and the command value related to the power of the actuator is zero, a biasing force by the biasing member acts between gears included in the speed-reduction mechanism, and abnormal noise is potentially generated due to a tooth contact between the gears on a surface different from a current contact surface.

In the tenth aspect of the disclosure, as described above, the reaction force controller controls the power of the actuator to be a value other than zero over the predetermined time even when the command value related to the power of the actuator changes from a value other than zero to zero.

According to the tenth aspect of the disclosure, even when the pedal member is returned to the original position after the stepping-in operation is performed, and a biasing force by the biasing member acts between the gears included in the speed-reduction mechanism, the power of the actuator is controlled to be a value other than zero, thereby preventing abnormal noise from being generated due to a tooth contact between the gears on a surface different from the current contact surface.

BRIEF DESCRIPTION OF THE DRAWINGS

FIGS. 8A, 8B, 8C, and 8D are each a temporal schematic graph of a temporal operation of a pedal reaction force applying device according to a second embodiment of the present disclosure, in comparison with Comparative Example.

FIGS. 10A, 10B, 10C, and 10D are each a temporal schematic graph of a temporal operation of a pedal reaction force applying device according to a fourth embodiment of the present disclosure, in comparison with Comparative Example.

DESCRIPTION OF THE PREFERRED EMBODIMENTS

Hereinafter, a pedal reaction force applying device 11 according to an embodiment of the present disclosure will be described in detail with reference to the accompanied drawings.

Figure 1:
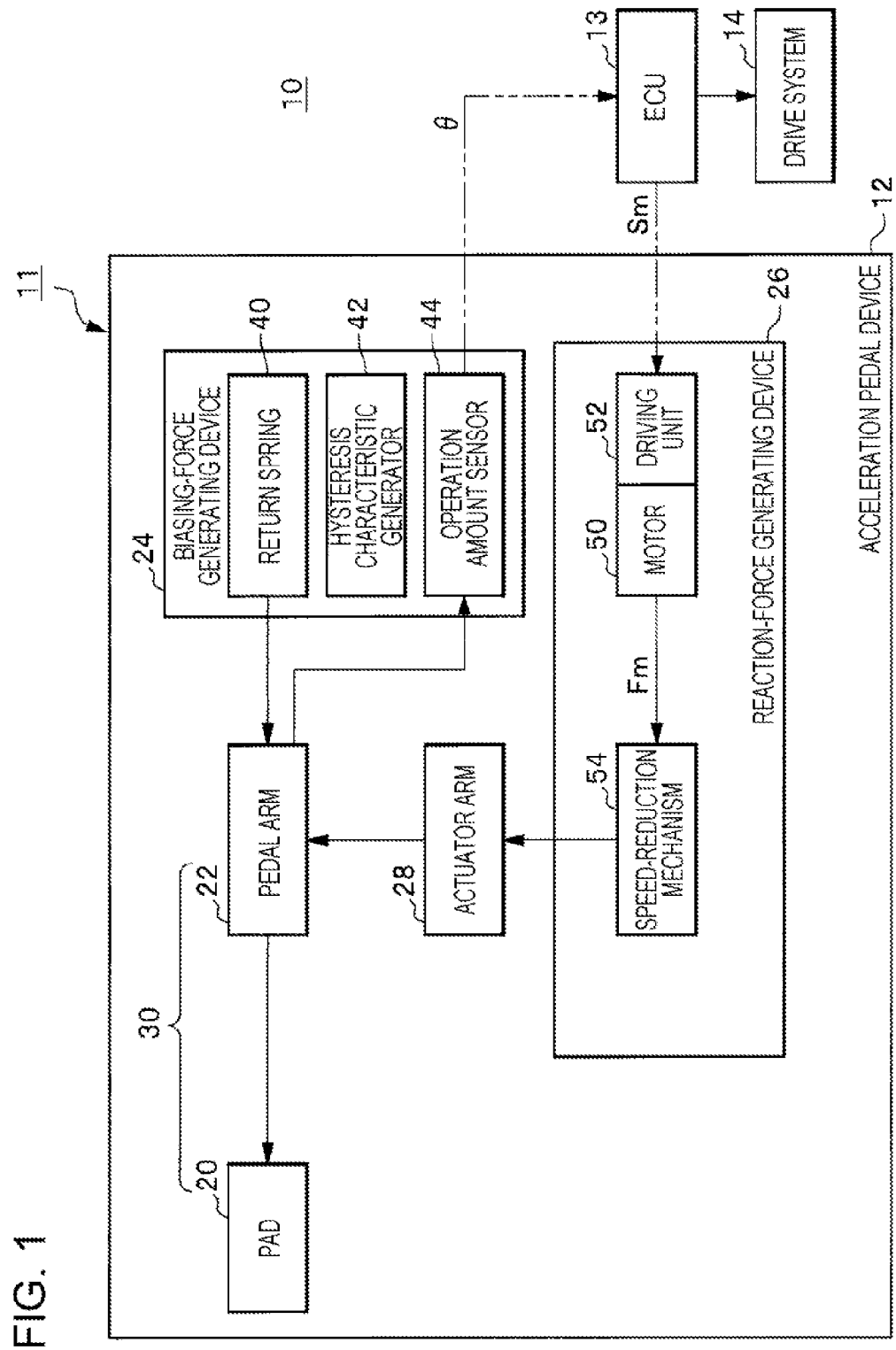
FIG. 1 is a block configuration diagram of a vehicle on which a pedal reaction force applying device according to an embodiment of the present disclosure is mounted.
Figure 2:
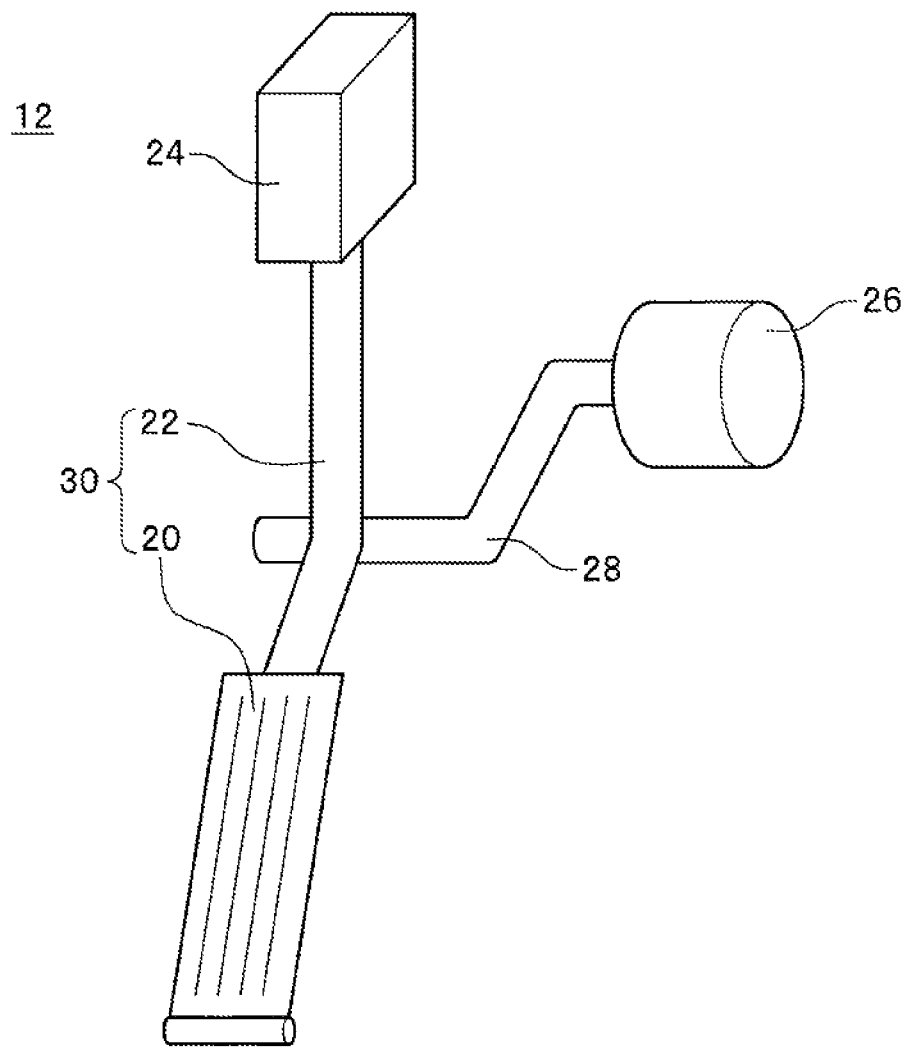
FIG. 2 is an external perspective view of an acceleration pedal device included in the pedal reaction force applying device.

FIG. 1 is a block configuration diagram of a vehicle 10 on which the pedal reaction force applying device 11 according to the embodiment of the present disclosure is mounted. FIG. 2 is an external perspective view of an acceleration pedal device 12 included in the pedal reaction force applying device 11. The vehicle 10 is, for example, an automobile on which the reciprocating engine (drive system 14) is mounted. The vehicle 10 may be a hybrid automobile, an electric automobile, and a fuel cell automobile.

As illustrated in FIG. 1, the pedal reaction force applying device 11 and the drive system 14 are mounted on the vehicle 10. The pedal reaction force applying device 11 includes the acceleration pedal device 12 and an electronic control unit (hereinafter, referred to as ECU) 13 that governs an operation control of the pedal reaction force applying device 11. The ECU 13 will be described in detail later. The drive system 14 has a function of supplying a drive power to the vehicle 10. The drive system 14 includes the reciprocating engine, a transmission, and a wheel, for example (all not illustrated).

[Configuration of Acceleration Pedal Device 12]

As illustrated in FIGS. 1 and 2, the acceleration pedal device 12 includes, a pad 20 on which a driver performs a stepping-in operation and a returning operation, a pedal arm 22, a biasing-force generating device 24, a reaction-force generating device 26, and an actuator arm 28. The pad 20 and the pedal arm 22 constitute an acceleration pedal 30.

As illustrated in FIG. 2, one end of the pedal arm 22 is fixed to the pad 20. The other end of the pedal arm 22 is supported pivotally relative to the biasing-force generating device 24.

The biasing-force generating device 24 generates, through a mechanical configuration, a first biasing force Fs1 for returning the acceleration pedal 30 on which the driver performs the stepping-in operation to an original position, and has a function of transmitting the first biasing force Fs1 to the pad 20 through the pedal arm 22. As illustrated in FIG. 1, the biasing-force generating device 24 includes a return spring 40, a hysteresis characteristic generator 42, and an operation amount sensor 44.

The hysteresis characteristic generator 42 has a function of adding a hysteresis characteristic to the first biasing force Fs1 generated by the return spring 40. Specifically, the hysteresis characteristic generator 42 increases the first biasing force Fs1 in the stepping-in operation of the acceleration pedal 30, and reduces the first biasing force Fs1 in the returning operation of the acceleration pedal 30. The return spring 40 and the hysteresis characteristic generator 42 may have, as appropriate, a configuration disclosed in, for example, International Publication No. 2001/19638, the entire contents of which are incorporated herein by reference.

The operation amount sensor 44 has a function of detecting a pedal operation amount θ of the acceleration pedal 30 by detecting a pivoting stroke per unit time related to the pedal arm 22. The detected value of the pedal operation amount θ may have, for example, a positive sign (+) for the operation amount θ in a direction moving away from the original position, and a negative sign (−) for the operation amount θ in a direction returning to the original position. The pedal operation amount θ detected by the operation amount sensor 44 is transmitted to the ECU 13. The operation amount sensor 44 may be provided to any part other than the biasing-force generating device 24 which allows detection of the pivoting stroke of the pedal arm 22.

Figure 3:
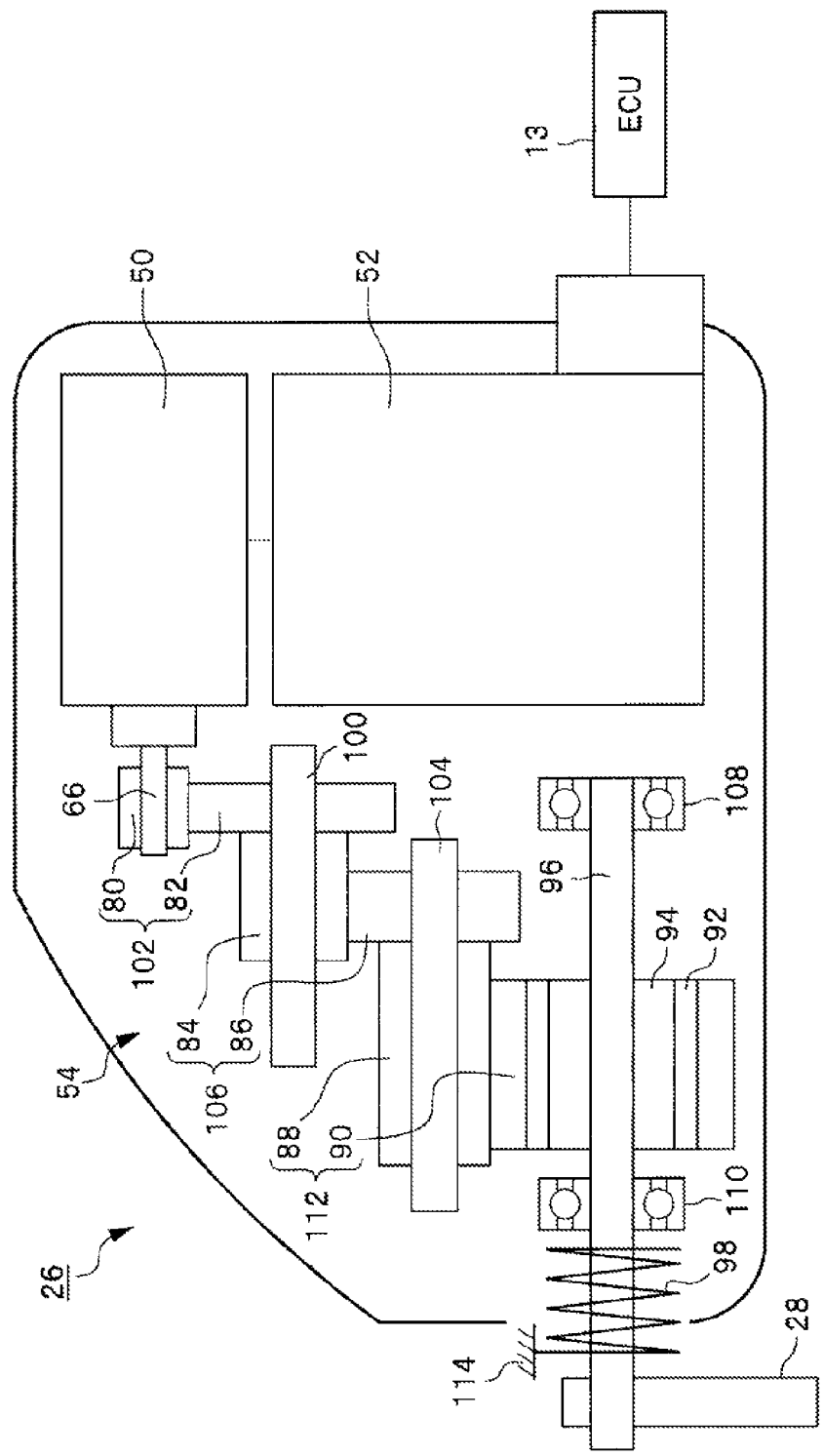
FIG. 3 is an internal configuration diagram of a reaction-force generating device included in the pedal reaction force applying device.

Next follows a description of the reaction-force generating device 26 with reference to FIG. 3. FIG. 3 is an internal configuration diagram of the reaction-force generating device 26 of the acceleration pedal device 12 included in the pedal reaction force applying device 11.

As illustrated in FIG. 3, the reaction-force generating device 26 has a function of generating a power Fm for applying a reaction force to the stepping-in operation and the returning operation of the acceleration pedal 30. As illustrated in FIGS. 1 and 3, the reaction-force generating device 26 includes a motor 50, a driving unit 52 for driving the motor 50, and a speed-reduction mechanism 54.

The motor 50 has a function of generating the power Fm in accordance with a drive control by the driving unit 52. As illustrated in FIG. 3, the power Fm generated by the motor 50 is transmitted to the speed-reduction mechanism 54 through a motor output shaft 66.

The motor 50 according to the present embodiment is, for example, a direct-current brushless motor including built-in Hall effect sensors (not illustrated) for detecting the rotation angle of the motor output shaft 66. However, the configuration of the motor 50 is not limited to the direct-current brushless motor. The motor 50 may be a direct-current brush motor, or an alternating-current three-phase motor. Alternatively, a pneumatic actuator may be used in place of the motor 50. The motor 50 corresponds to an "actuator" according to the present disclosure.

The driving unit 52 has a function of performing a drive control of the motor 50 in accordance with a control signal Sm transmitted from the ECU 13.

As illustrated in FIG. 3, the speed-reduction mechanism 54 includes first to sixth gears 80, 82, 84, 86, 88, and 90 as reducing gears, a torque limiter 92, a one-way clutch 94, a speed-reduction mechanism output shaft (also simply referred to as "output shaft") 96, and a biasing member 98.

The first gear 80 is provided to the motor output shaft 66. The second gear 82 is provided to a first intermediate shaft 100 pivotally supported (not illustrated) on a housing internal wall. The second gear 82 is engaged with the first gear 80. The first gear 80 and the second gear 82 constitute a first reducer 102.

The third gear 84 is provided to the first intermediate shaft 100 shared with the second gear 82. The fourth gear 86 is provided to a second intermediate shaft 104 pivotally supported on the housing internal wall. The fourth gear 86 is engaged with the third gear 84. The third gear 84 and the fourth gear 86 constitute a second reducer 106.

The fifth gear 88 is provided to the second intermediate shaft 104 shared with the fourth gear 86. The sixth gear 90 is pivotally supported by bearings 108 and 110 and is provided to the output shaft 96 fixed to the actuator arm 28. The sixth gear 90 is engaged with the fifth gear 88. The fifth gear 88 and the sixth gear 90 constitute a third reducer 112.

As described above, the speed-reduction mechanism 54 including three pairs of the reducing gears includes the three reducers (first to third reducers 102, 106, and 112). Thus, the speed-reduction mechanism 54 operates to perform a speed reduction in three stages.

The torque limiter 92 includes a limiter inside part (not illustrated in FIG. 3) fixed to the one-way clutch 94 closer to the output shaft 96, and a limiter outside part (not illustrated in FIG. 3) fixed to the sixth gear 90 closer to the motor 50. The torque limiter 92 operates so that one of the limiter inside part and the limiter outside part slides relative to the other when a predetermined torque is applied by the power (hereinafter, referred to as "motor power") Fm of the motor 50. This allows the output shaft 96 to smoothly rotate to the stepping-in operation of the acceleration pedal 30 even when the motor 50 or any one of the first to third reducers 102, 106, and 112 is locked.

The one-way clutch 94 includes a clutch inside part (not illustrated in FIG. 3) fixed to the output shaft 96, and a clutch outside part (not illustrated in FIG. 3) fixed to the limiter inside part of the torque limiter 92 closer to the motor 50. In the stepping-in operation and the returning operation of the acceleration pedal 30, the clutch inside part and the clutch outside part corotate.

When an output direction of the output shaft 96 is in a returning direction in which the acceleration pedal 30 moves closer to the original position, the clutch inside part and the clutch outside part corotate. In contrast, when the output direction of the output shaft 96 is in a stepping-in direction in which the acceleration pedal 30 moves away from the original position, only the clutch inside part rotates, while the clutch outside part does not rotate (rotates idle).

The biasing member 98 is, for example, a coil spring. One end of the biasing member 98 is fixed to the output shaft 96, whereas the other end thereof is fixed to a bracket 114. This allows the biasing member 98 to generate a second biasing force Fs2 to bias the output shaft 96 in a direction of returning the actuator arm 28 coupled with the output shaft 96 to the original position. Thus, as illustrated in FIG. 2, part of the actuator arm 28 operates constantly in contact with part of the pedal arm 22.

As illustrated in FIG. 3, one end of the actuator arm 28 is coupled with one end of the output shaft 96. Thus, the actuator arm 28 is configured to operate simultaneously with an operation of the output shaft 96.

The pedal arm 22, the actuator arm 28, and the speed-reduction mechanism 54 correspond to a "power transmitting device" according to the present disclosure.

[Configuration of Electronic Control Unit (ECU) 13]

Figure 4:
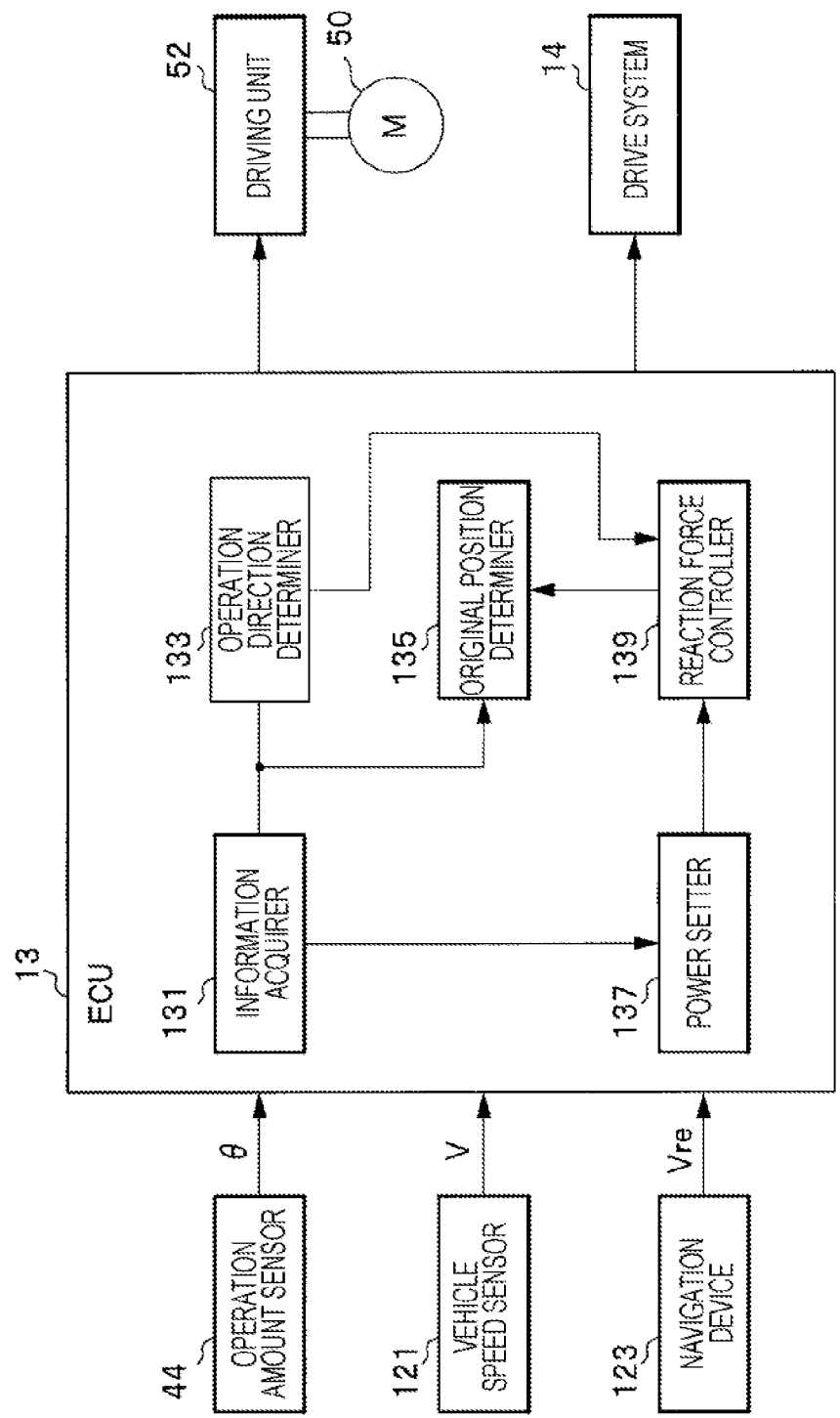
FIG. 4 is a block diagram of a schematic configuration of an electronic control unit (ECU) included in the pedal reaction force applying device.

Next follows a description of the configuration of the ECU 13 with reference to FIG. 4. FIG. 4 is a block diagram of a schematic configuration of the electronic control unit (ECU) 13 included in the pedal reaction force applying device 11.

As illustrated in FIG. 4, the ECU 13 is connected to, as an input system, the operation amount sensor 44, a vehicle speed sensor 121, and a navigation device 123, and also connected to, as an output system, the driving unit 52 and the drive system 14 described above.

The vehicle speed sensor 121 has a function of detecting a vehicle speed V as the traveling speed of the vehicle 10. The vehicle speed V detected by the vehicle speed sensor 121 is transmitted to the ECU 13.

The navigation device 123 has a function of detecting the current position of the vehicle 10 by using the Global Positioning System (GPS), and reading out a recommended vehicle speed Vre corresponding to the current position of the vehicle 10 with reference to the recommended vehicle speeds Vre previously stored for each road. The recommended vehicle speed Vre is, for example, a fuel-consumption optimizing speed in accordance with conditions (slope, paved or not, and straight or winding road, for example) for each road, and a speed limit. The recommended vehicle speed Vre corresponding to the current position of the vehicle 10 read out by the navigation device 123 is transmitted to the ECU 13.

The ECU 13 includes a microcomputer including, for example, a central processing unit (CPU), a read only memory (ROM), and a random access memory (RAM). This microcomputer reads out and executes program stored in the ROM, and operates to perform an execution control related to various functions including a function of acquiring various information stored in the ECU 13, an operation direction determination function, an original position determination function, a power calculation function, and a reaction force control function.

To achieve the various functions described above, the ECU 13 includes, as illustrated in FIG. 4, an information acquirer 131, an operation direction determiner 133, an original position determiner 135, a power setter 137, and a reaction force controller 139.

The information acquirer 131 has a function of acquiring the pedal operation amount θ detected by the operation amount sensor 44, the vehicle speed V detected by the vehicle speed sensor 121, and the recommended vehicle speed Vre corresponding to the current position of the vehicle 10 acquired by the navigation device 123. The information acquirer 131 corresponds to an "operation amount acquirer" according to the present disclosure.

The operation direction determiner 133 has a function of determining an operation direction of the acceleration pedal 30 with reference to a temporal change characteristic related to the pedal operation amount θ acquired by the information acquirer 131. Specifically, the operation direction determiner 133 determines the operation direction of the acceleration pedal 30 with reference to whether the temporal change characteristic (for example, a time differential value of the pedal operation amount θ) related to the pedal operation amount θ acquired by the information acquirer 131 points in the stepping-in direction or the returning direction. When the temporal change characteristic related to the pedal operation amount θ is maintained (no change), the operation direction determiner 133 may determine the operation direction of the acceleration pedal 30 using a previous determination result.

Figure 5:
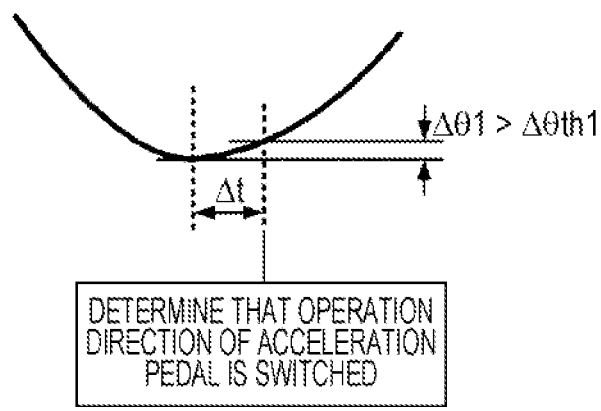
FIG. 5 is an explanatory diagram of a first procedure of calculating a switching point of an operation direction of an acceleration pedal.
Figure 6:
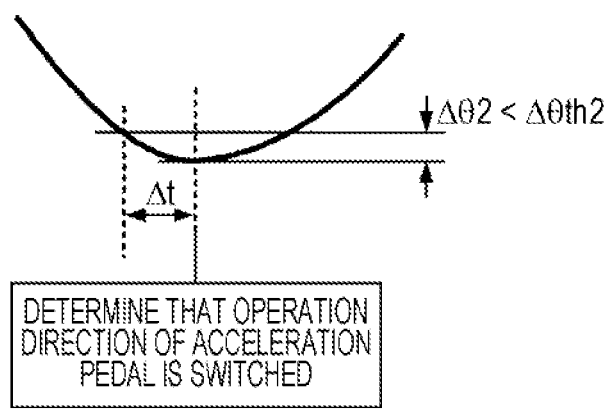
FIG. 6 is an explanatory diagram of a second procedure of calculating the switching point of the operation direction of the acceleration pedal.

The operation direction determiner 133 has a function of calculating the operation direction of the acceleration pedal 30 and a switching point thereof in accordance with a first procedure or a second procedure described below. Next follows a description of the first procedure and the second procedure with reference to FIGS. 5 and 6. FIG. 5 is an explanatory diagram of the first procedure of calculating the switching point of the operation direction of the acceleration pedal 30. FIG. 6 is an explanatory diagram of the second procedure of calculating the switching point of the operation direction of the acceleration pedal 30.

In the first procedure illustrated in FIG. 5, the operation direction determiner 133 determines that the operation direction of the acceleration pedal 30 is switched, when a change direction of the pedal operation amount θ acquired by the information acquirer 131 is inverted and a temporal variation (variation in the operation amount θ per certain unit time Δt) Δθ1 related to the pedal operation amount θ after the inversion becomes larger than a predetermined first variation threshold Δθth1. The first procedure is applicable not only to switching of the operation direction of the acceleration pedal 30 from the returning direction to the stepping-in direction, but also to switching from the stepping-in direction to the returning direction.

The first variation threshold Δθth1 may be set to the value of the variation related to the pedal operation amount θ with which the operation direction of the acceleration pedal 30 can be assumed to be switched, as appropriate.

The first procedure prevents an abrupt change in the magnitude of the pedal reaction force even when, for example, the driver frequently performs the stepping-in operation and the returning operation to maintain a certain operation amount of the acceleration pedal 30 or to perform a fine adjustment of the operation amount, thereby providing a comfortable pedal operation feeling to the driver.

In the second procedure illustrated in FIG. 6, the operation direction determiner 133 determines that the operation direction of the acceleration pedal 30 is switched, when a temporal variation (variation in the operation amount θ per certain unit time Δt) Δθ2 related to the pedal operation amount θ acquired by the information acquirer 131 becomes less than a predetermined second variation threshold Δθth2. The second procedure is applicable to the switching of the operation direction of the acceleration pedal 30 from the returning direction to the stepping-in direction, but also to the switching from the stepping-in direction to the returning direction. The second variation threshold Δθth2 may be set to the value of the temporal variation related to the pedal operation amount θ with which the operation direction of the acceleration pedal 30 can be assumed to be switched, as appropriate.

The second procedure predicts the switching point of the operation direction before actual switching of the operation direction, enabling smooth switching from one of a returning direction power FmH and a stepping-in direction power FmL (refer to FIG. 7B to be described later) to the other when the operation direction is switched. This can provide a comfortable pedal operation feeling to the driver.

The first and second procedures to calculate the operation direction of the acceleration pedal 30 and the switching point thereof are applied in combination with the pedal reaction force applying device 11 according to any one of first to fourth embodiments to be described later.

The original position determiner 135 has a function of determining whether the acceleration pedal 30 is returned to the original position. Specifically, the original position determiner 135 determines whether the acceleration pedal 30 is returned to the original position based on the pedal operation amount θ acquired by the information acquirer 131.

The power setter 137 has a function of calculating a target upper limit vehicle speed Vtar based on the pedal operation amount θ, the vehicle speed V, and the recommended vehicle speed Vre corresponding to the current position of the vehicle 10 acquired by the information acquirer 131, and setting the motor power (the returning direction power FmH and the stepping-in direction power FmL) based on a relation between the target upper limit vehicle speed Vtar thus calculated and the vehicle speed V.

The returning direction power FmH is a motor power set to act on the acceleration pedal 30 in the returning operation of the acceleration pedal 30 toward the original position. The returning direction power FmH is set to an appropriate value through, for example, a simulation or a traveling experiment using an actual vehicle, because the magnitude of the pedal reaction force in the returning operation of the acceleration pedal 30 is balanced with the magnitude of the pedal reaction force in the stepping-in operation of the acceleration pedal 30 in a direction moving away from the original position. Specifically, the returning direction power FmH is set to a value larger than the stepping-in direction power FmL.

The stepping-in direction power FmL is a motor power set to act on the acceleration pedal 30 in the stepping-in operation of the acceleration pedal 30. The stepping-in direction power FmL is set to an appropriate value through, for example, a simulation or a traveling experiment using an actual vehicle, because the magnitude of the pedal reaction force in the stepping-in operation of the acceleration pedal 30 is balanced with the magnitude of the pedal reaction force in the returning operation of the acceleration pedal 30.

The returning direction power FmH and the stepping-in direction power FmL may be set to appropriate values by, for example, multiplying a common reference motor power by predetermined gains (returning direction gain and stepping-in direction gain), respectively.

The reaction force controller 139 has a function of controlling the magnitude of the pedal reaction force by performing a control to switch the motor power Fm to an appropriate one of the returning direction power FmH and the stepping-in direction power FmL set by the power setter 137 basically based on a determination result of the operation direction of the acceleration pedal 30 acquired by the operation direction determiner 133.

Specifically, the reaction force controller 139 switches the type of the motor power Fm so that the returning direction power FmH when the operation direction of the acceleration pedal 30 is in the returning direction is larger than the stepping-in direction power FmL when the operation direction is in the stepping-in direction, and provides the control signal Sm related to the motor power Fm after the switching to the driving unit 52.

With this configuration, the pedal reaction force applying device 11 can reduce a difference in the magnitude of the pedal reaction force between the stepping-in operation and the returning operation of the acceleration pedal 30.

The power setter 137 and the reaction force controller 139 correspond to a "reaction force controller" according to the present disclosure.

The pedal reaction force applying device 11 configured as described above includes an operation switch (not illustrated) used to selectively set whether to activate or deactivate a pedal reaction force applying function. In the following description, the operation switch is assumed to be set to activate the pedal reaction force applying function unless otherwise mentioned.

[Temporal Operation of Pedal Reaction Force Applying Device 11 According to First Embodiment]

Figure 7A:
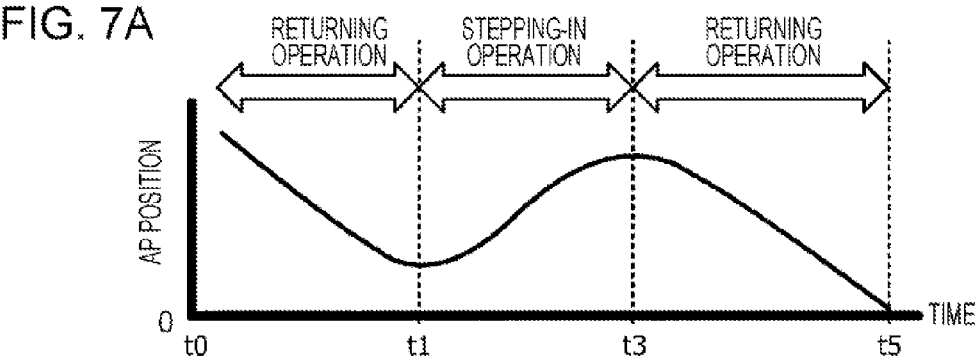
FIGS. 7A, 7B, 7C, and 7D are each a temporal schematic graph of a temporal operation of a pedal reaction force applying device according to a first embodiment of the present disclosure, in comparison with Comparative Example.
Figure 7B:
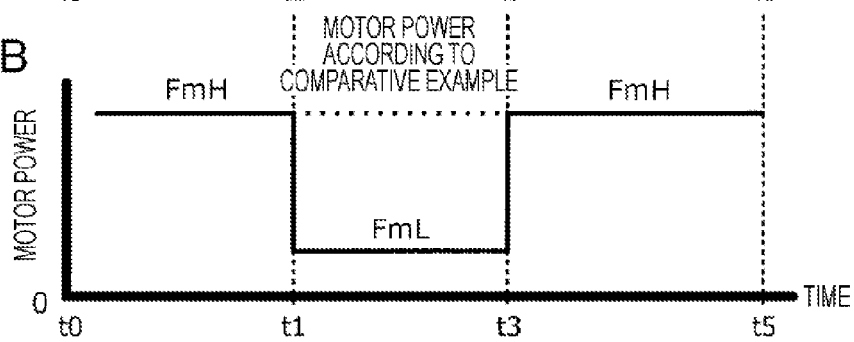
Figure 7C:
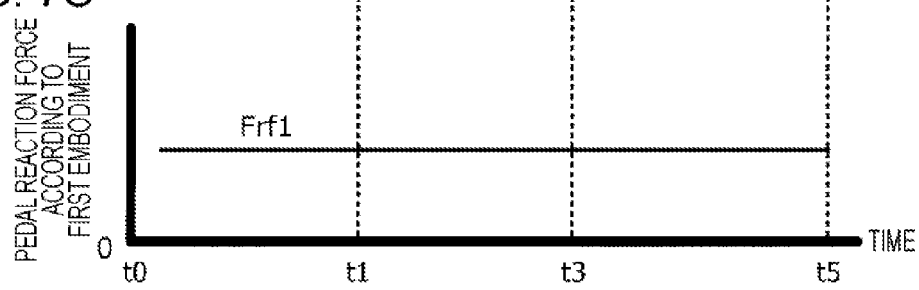
Figure 7D:
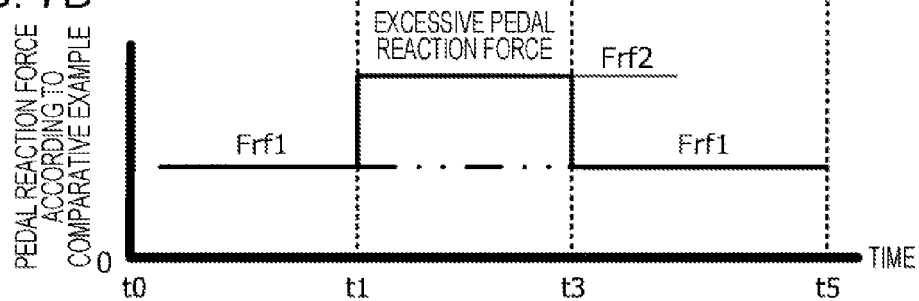

Next follows a description of a temporal operation of the pedal reaction force applying device 11 according to a first embodiment of the present disclosure with reference to FIGS. 7A, 7B, 7C, and 7D. FIGS. 7A, 7B, 7C, and 7D are each a temporal schematic graph of the temporal operation of the pedal reaction force applying device 11 according to the first embodiment in comparison with Comparative Example. FIG. 7A illustrates a temporal change of an acceleration pedal position (AP position), FIG. 7B illustrates a temporal change of the motor power Fm, FIG. 7C illustrates a temporal change of a pedal reaction force according to the first embodiment, and FIG. 7D illustrates a temporal change of a pedal reaction force according to Comparative Example.

In time between t0 and t1, the returning operation of the acceleration pedal 30 is performed in a direction of moving toward the original position (refer to FIG. 7A). In this duration, the motor power Fm maintains the relatively large returning direction power FmH (refer to FIG. 7B). The value of the pedal reaction force according to the first embodiment is obtained by substituting the returning direction power FmH, and a speed reduction ratio and the efficiency of the speed-reduction mechanism 54 into Equation 2 described above (refer to "Frf1" in FIG. 7C).

To calculate the pedal reaction force, Equation 2 described above involves multiplication by the efficiency as a value less than one. Thus, a value Frf1 of the pedal reaction force according to the first embodiment is smaller than the returning direction power FmH. The pedal reaction force according to Comparative Example has the same value as the value Frf1 of the pedal reaction force according to the first embodiment (refer to FIG. 7D).

At time t1, the operation direction of the acceleration pedal 30 is switched from the returning direction to the stepping-in direction (refer to FIG. 7A). Simultaneously at time t1, the motor power Fm is immediately switched from the relatively large returning direction power FmH to the relatively small stepping-in direction power FmL (refer to FIG. 7B).

In time between t1 and t3, the stepping-in operation of the acceleration pedal 30 is performed in a direction of moving away from the original position (refer to FIG. 7A). In this duration, the motor power Fm maintains the relatively small stepping-in direction power FmL (refer to FIG. 7B). The value of the pedal reaction force according to the first embodiment is obtained by substituting the stepping-in direction power FmL, and the speed reduction ratio and the efficiency of the speed-reduction mechanism 54 into Equation 1 described above (refer to "Frf1" in FIG. 7C). To calculate the pedal reaction force, Equation 1 described above involves division by the efficiency as a value less than one. Thus, the value Frf1 of the pedal reaction force according to the first embodiment is larger than the stepping-in direction power FmL.

In contrast, the pedal reaction force according to Comparative Example has an excessive value Frf2 (>Frf1) as compared to the value Frf1 of the pedal reaction force according to the first embodiment (refer to FIG. 7D).

At time t3, the operation direction of the acceleration pedal 30 is switched from the stepping-in direction to the returning direction (refer to FIG. 7A). Simultaneously at time t3, the motor power Fm is immediately switched from the relatively small stepping-in direction power FmL to the relatively large returning direction power FmH (refer to FIG. 7B).

In time between t3 and t5, the returning operation of the acceleration pedal 30 is performed in a direction of moving toward the original position (refer to FIG. 7A). In this duration, as in time between t0 and t1, the motor power Fm maintains the returning direction power FmH (refer to FIG. 7B). The value Frf1 of the pedal reaction force according to the first embodiment is smaller than the returning direction power FmH as in time between t0 and t1. The pedal reaction force according to Comparative Example has the same value as the value Frf1 of the pedal reaction force according to the first embodiment (refer to FIG. 7D).

In the pedal reaction force applying device 11 according to the first embodiment, the power setter 137 sets the stepping-in direction power FmL as the motor power Fm when the operation direction of the acceleration pedal 30 is in the stepping-in direction, and the returning direction power FmH having a magnitude different from the magnitude of the stepping-in direction power FmL as the motor power Fm when the operation direction of the acceleration pedal 30 is in the returning direction (where FmH>FmL).

Then, the reaction force controller 139 immediately performs switching from the returning direction power to the stepping-in direction power when the operation direction of the acceleration pedal 30 changes from the returning direction to the stepping-in direction, and immediately performs switching from the stepping-in direction power to the returning direction power when the operation direction of the acceleration pedal 30 changes from the stepping-in direction to the returning direction.

The pedal reaction force applying device 11 according to the first embodiment sets the stepping-in direction power FmL and the returning direction power FmH to such values that the value Frf1 of the pedal reaction force is the same between the returning direction and the stepping-in direction, thereby providing a comfortable pedal operation feeling to the driver irrespective of the operation direction of the acceleration pedal 30.

[Temporal Operation of Pedal Reaction Force Applying Device 11 According to Second Embodiment]

Next follows a description of the temporal operation of the pedal reaction force applying device 11 according to a second embodiment of the present disclosure with reference to FIGS. 8A, 8B, 8C, and 8D. FIGS. 8A, 8B, 8C, and 8D are each a temporal schematic graph of the temporal operation of the pedal reaction force applying device 11 according to the second embodiment in comparison with Comparative Example. FIG. 8A illustrates the temporal change of the acceleration pedal position (AP position), FIG. 8B illustrates the temporal change of the motor power Fm, FIG. 8C illustrates the temporal change of the pedal reaction force according to the second embodiment, and FIG. 8D illustrates the temporal change of the pedal reaction force according to Comparative Example.

The temporal operation the pedal reaction force applying device 11 according to the second embodiment shares a common part with the temporal operation of the pedal reaction force applying device 11 according to the first embodiment. Thus, description of the temporal operation of the pedal reaction force applying device 11 according to the second embodiment focuses on any difference therebetween. The temporal operation the pedal reaction force applying device 11 according to the second embodiment differs from the temporal operation of the pedal reaction force applying device 11 according to the first embodiment in its operation in time between t3 and t4.

At time t3, the operation direction of the acceleration pedal 30 is switched from the stepping-in direction to the returning direction (refer to FIG. 8A). Simultaneously at time t3, the motor power Fm is immediately switched from the relatively small stepping-in direction power FmL to the relatively large returning direction power FmH (refer to FIG. 8B).

After the operation direction of the acceleration pedal 30 is switched from the stepping-in direction to the returning direction at time t3, the returning operation of the acceleration pedal 30 is performed in a direction of moving toward the original position in time between t3 and t4 (refer to FIG. 8A). In this duration, the motor power Fm linearly and gradually (incrementally) changes from the stepping-in direction power FmL to the returning direction power FmH (refer to FIG. 8B). The value of the pedal reaction force according to the second embodiment once decreases from the value Frf1 of the pedal reaction force according to the first embodiment to a value Frf3 smaller than the value Frf1 at time t3, and then linearly and gradually (incrementally) increases until reaching the value Frf1 again (refer to FIG. 8C). The pedal reaction force according to Comparative Example has the same value as the value Frf1 of the pedal reaction force according to the first embodiment (refer to FIG. 8D).

A switching to abruptly increase the reaction force when the operation direction of the acceleration pedal 30 changes from the stepping-in direction to the returning direction may potentially cause discomfort to the driver.

In the pedal reaction force applying device 11 according to the second embodiment, the reaction force controller 139 immediately performs the switching from the returning direction power to the stepping-in direction power when the operation direction of the acceleration pedal 30 changes from the returning direction to the stepping-in direction, and more gradually performs the switching from the stepping-in direction power to the returning direction power when the operation direction of the acceleration pedal 30 changes from the stepping-in direction to the returning direction than the switching from the returning direction power to the stepping-in direction power.

The pedal reaction force applying device 11 according to the second embodiment smoothly increases the pedal reaction force when the operation direction of the acceleration pedal 30 changes from the stepping-in direction to the returning direction, thereby providing a comfortable pedal operation feeling to the driver irrespective of the operation direction of the acceleration pedal 30.

[Temporal Operation of Pedal Reaction Force Applying Device 11 According to Third Embodiment]

Figure 9A:
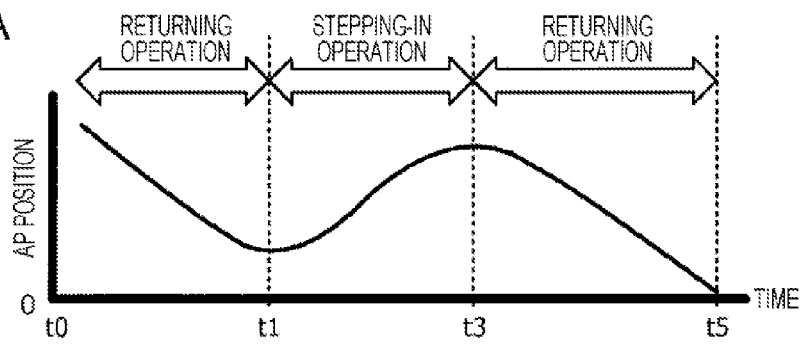
FIGS. 9A, 9B, 9C, and 9D are each a temporal schematic graph of a temporal operation of a pedal reaction force applying device according to a third embodiment of the present disclosure, in comparison with Comparative Example.
Figure 9B:
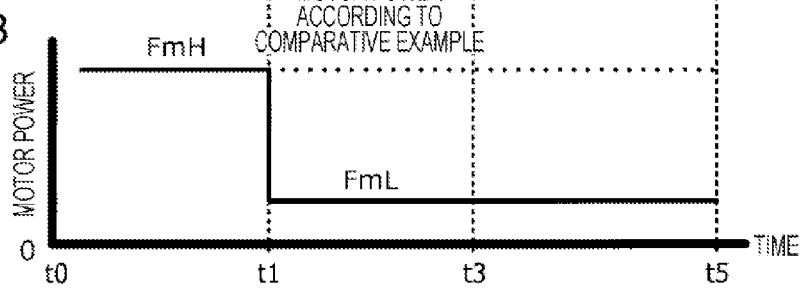
Figure 9C:
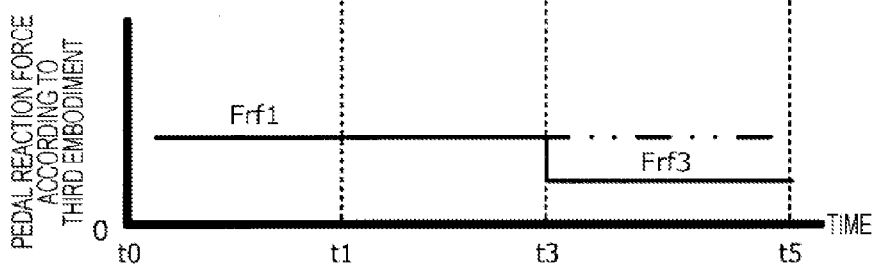
Figure 9D:
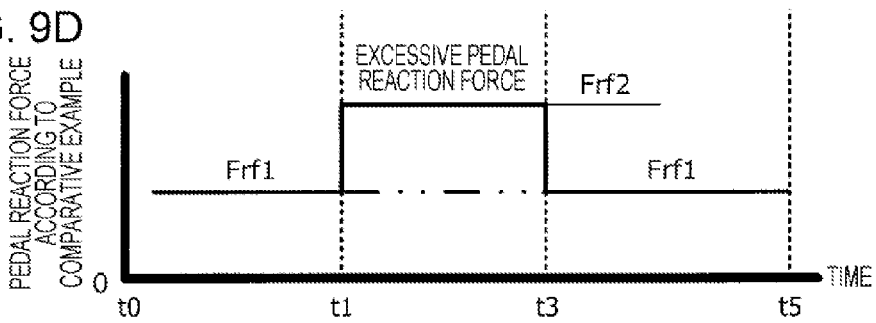

Next follows a description of the temporal operation of the pedal reaction force applying device 11 according to a third embodiment of the present disclosure with reference to FIGS. 9A, 9B, 9C, and 9D. FIGS. 9A, 9B, 9C, and 9D are each a temporal schematic graph of the temporal operation of the pedal reaction force applying device 11 according to the third embodiment in comparison with Comparative Example. FIG. 9A illustrates the temporal change of the acceleration pedal position (AP position), FIG. 9B illustrates the temporal change of the motor power Fm, FIG. 9C illustrates the temporal change of the pedal reaction force according to the third embodiment, and FIG. 9D illustrates the temporal change of the pedal reaction force according to Comparative Example.

The temporal operation the pedal reaction force applying device 11 according to the second embodiment shares a common part with the temporal operation of the pedal reaction force applying device 11 according to the third embodiment. Thus, description of the temporal operation of the pedal reaction force applying device 11 according to the third embodiment focuses on any difference therebetween. The temporal operation of the pedal reaction force applying device 11 according to the third embodiment differs from the temporal operation the pedal reaction force applying device 11 according to the second embodiment in its operation in time between t3 and t5.

After the operation direction of the acceleration pedal 30 is switched from the stepping-in direction to the returning direction at time t3, the returning operation of the acceleration pedal 30 is performed in a direction of moving toward the original position in time between t3 and t5 (refer to FIG. 9A). In this duration, the motor power Fm maintains the stepping-in direction power FmL (refer to FIG. 9B). The value of the pedal reaction force according to the third embodiment once decreases from the value Frf1 of the pedal reaction force according to the first and second embodiments to the value Frf3 smaller than the value Frf1 at time t3, and then maintains the value Frf3 (refer to FIG. 9C). The pedal reaction force according to Comparative Example has the same value as the value Frf1 of the pedal reaction force according to the first and second embodiments (refer to FIG. 8D).

When the operation direction of the acceleration pedal 30 changes from the stepping-in direction to the returning direction, the pedal reaction force applying device 11 according to the third embodiment maintains the stepping-in direction power until a predetermined initialization condition is established after the change.

For example, when the driver abruptly changes the operation direction from the stepping-in operation to the returning operation but the pedal reaction force applying device 11 according to the third embodiment fails to acquire a process of this abrupt change, the pedal reaction force applying device 11 still prevents an increase in the reaction force due to delayed switching to the returning direction power from the stepping-in direction power that provides a smaller reaction force, even though the operation has already been performed in the returning direction, thereby achieving a reduction in discomfort caused to the driver.

The initialization condition that defines the end of the duration in which the stepping-in direction power is maintained is established when the original position determiner 135 determines that the acceleration pedal 30 is returned to the vicinity of the original position.

The original position determiner 135 may be configured to determine that the acceleration pedal 30 is returned to the vicinity of the original position when, for example, the acceleration pedal 30 is actually returned to the vicinity of the original position or assumed so.

According to the configuration described above, when the operation direction of the acceleration pedal 30 changes from the stepping-in direction to the returning direction, the stepping-in direction power is maintained with no switching performed from the stepping-in direction power to the returning direction power until the acceleration pedal 30 is determined to be returned to the vicinity of the original position after the change (until the initialization condition is established), thereby achieving a reduction in discomfort caused to the driver by switching of the type (magnitude) of the motor power while the motor power Fm is controlled, so that a comfortable pedal operation feeling can be provided to the driver.

[Temporal Operation of Pedal Reaction Force Applying Device 11 According to Fourth Embodiment]

Next follows a description of the temporal operation of the pedal reaction force applying device 11 according to a fourth embodiment of the present disclosure with reference to FIGS. 10A, 10B, 10C, and 10D. FIGS. 10A, 10B, 10C, and 10D are each a temporal schematic graph of the temporal operation of the pedal reaction force applying device 11 according to the fourth embodiment in comparison with Comparative Example. FIG. 10A illustrates the temporal change of the acceleration pedal position (AP position), FIG. 10B illustrates the temporal change of the motor power Fm, FIG. 10C illustrates the temporal change of the pedal reaction force according to the fourth embodiment, and FIG. 10D illustrates the temporal change of the pedal reaction force according to Comparative Example.

The temporal operation of the pedal reaction force applying device 11 according to the third embodiment shares a common part with the temporal operation of the pedal reaction force applying device 11 according to the fourth embodiment. Thus, description of the temporal operation of the pedal reaction force applying device 11 according to the fourth embodiment focuses on any difference therebetween. The temporal operation of the pedal reaction force applying device 11 according to the fourth embodiment differs from the temporal operation of the pedal reaction force applying device 11 according to the third embodiment in its operation in time between t1 and t2.

At time t1, after the operation direction of the acceleration pedal 30 is switched from the returning direction to the stepping-in direction, the stepping-in operation of the acceleration pedal 30 is performed in a direction of moving away from the original position in time between t1 and t2 (refer to FIG. 10A). In this duration, the motor power Fm linearly and gradually (incrementally) changes from the returning direction power FmH to the stepping-in direction power FmL (refer to FIG. 10B). The value of the pedal reaction force according to the fourth embodiment once increases from the value Frf1 of the pedal reaction force according to the first to third embodiments to a peak value Frf4 higher than the value Frf1 at time t1, and then linearly and gradually (decrementally) decreases until reaching the value Frf1 again (refer to FIG. 10C).

In contrast, the value of the pedal reaction force according to Comparative Example has an excessive value Frf2 (>Frf1) as compared to the peak value of the pedal reaction force according to the fourth embodiment (refer to FIG. 10D).

The pedal reaction force applying device 11 according to the fourth embodiment gradually switches from the returning direction power FmH to the stepping-in direction power FmL when the operation direction of the acceleration pedal 30 changes from the returning direction to the stepping-in direction. This prevents an abrupt change in the magnitude of the pedal reaction force even when, for example, the driver repeats the stepping-in operation and the returning operation to maintain a certain operation amount of the acceleration pedal 30 or to perform a fine adjustment of the operation amount, thereby achieving a reduction in discomfort caused to the driver.

[Other Embodiments]

The embodiments described above are merely examples of the present disclosure. Thus, it should be understood that these embodiments do not limit the technical range of the present disclosure. This is because modifications of the present disclosure are allowed as appropriate without departing from its scope or main feature.

Specifically, for example, the embodiments of the present disclosure may have the following configuration. The power transmitting device includes the actuator arm 28 coupled with the speed-reduction mechanism 54 to transmit the motor power to the acceleration pedal 30 and the biasing member 98 that biases the actuator arm 28 in a direction of returning the acceleration pedal 30 to the original position. The motor power is set based on at least one of the traveling state and the traveling condition of the vehicle 10. The reaction force controller 139 controls the motor power to be a value other than zero (which is not limited to a particular value, but is preferably a significantly small value for power saving) over a predetermined time even when a command value related to the motor power changes from a value other than zero to zero.

According to the configuration as described above, even when the acceleration pedal 30 is returned to the original position after the stepping-in operation, and a biasing force by the biasing member 98 acts between the gears included in the speed-reduction mechanism 54, the motor power is controlled to be a value other than zero, thereby preventing abnormal noise from being generated due to a tooth contact between the gears on a surface different from the current contact surface.

The embodiments of the present disclosure describes the pedal operation amount θ detected by the operation amount sensor 44 as example input information used to determine the operation direction of the pedal member, but the present disclosure is not limited to this example. The input information may be, for example, motor rotation information (including the rotational direction and the rotational speed of the motor 50) detected by built-in Hall effect sensors included in the motor 50.

The embodiments of the present disclosure exemplarily describe as an example the power setter 137 that calculates the target upper limit vehicle speed Vtar based on the pedal operation amount θ, the vehicle speed V, and the recommended vehicle speed Vre corresponding to the current position of the vehicle 10, and sets the motor power (the returning direction power FmH and the stepping-in direction power FmL) based on the relation between the target upper limit vehicle speed Vtar thus calculated and the vehicle speed V, but the present disclosure is not limited to this example. Any procedure for setting the motor power (the returning direction power FmH and the stepping-in direction power FmL) may be adopted without departing from the scope of the present disclosure.

The embodiments of the present disclosure exemplarily describe the acceleration pedal 30 as the pedal member, but the present disclosure is not limited to this example. The pedal member according to the present disclosure may be a brake pedal operated in a braking operation of the vehicle in place of or in addition to the acceleration pedal 30.

The embodiments of the present disclosure exemplarily describe the speed-reduction mechanism 54 that performs the speed reduction in three stages, but the present disclosure is not limited to this example. In the present disclosure, the speed-reduction mechanism 54 having an optional configuration (including the number of reduction stages and the type of a gear) can be adopted as appropriate without departing from the scope of the present disclosure.

What is claimed is:

1. A pedal reaction force applying device comprising:
    a pedal member provided to a vehicle and operable for a driver to perform a stepping-in operation in which the pedal member is operated in a stepping-in direction and a returning operation in which the pedal member is operated in a returning direction;
    an actuator configured to generate a power as a pedal reaction force applied to the pedal member in the stepping-in operation and the returning operation of the pedal member;
    a power transmitting device including a speed-reduction mechanism and provided between the pedal member and the actuator to transmit the power of the actuator to the pedal member via the speed-reduction mechanism;
    an operation direction determiner configured to determine whether an operation direction of the pedal member is the stepping-in direction or the returning direction; and
    a reaction force controller configured to control the pedal reaction force, wherein
    the reaction force controller controls a magnitude of the pedal reaction force by controlling the power of the actuator based on the operation direction of the pedal member determined by the operation direction determiner,
    the reaction force controller sets: a stepping-in direction power as the power of the actuator when the operation direction of the pedal member is in a stepping-in direction; and a returning direction power having a magnitude different from a magnitude of the stepping-in direction power as the power of the actuator when the operation direction of the pedal member is in a returning direction, and
    the reaction force controller performs switching from the returning direction power to the stepping-in direction power when the operation direction of the pedal member changes from the returning direction to the stepping-in direction, whereas the reaction force controller maintains, when the operation direction of the pedal member changes from the stepping-in direction to the returning direction, the stepping-in direction power until a predetermined initialization condition is established after the change.

2. The pedal reaction force applying device according to claim 1, wherein
    the reaction force controller controls the power of the actuator such that the power of the actuator becomes larger when the operation direction of the pedal member is in the returning direction than when the operation direction of the pedal member is in the stepping-in direction.

3. The pedal reaction force applying device according to claim 1, wherein
    the reaction force controller further performs switching from the returning direction power to the stepping-in direction power when the operation direction of the pedal member changes from the returning direction to the stepping-in direction, whereas the reaction force controller performs switching from the stepping-in direction power to the returning direction power more gradually than the switching from the returning direction power to the stepping-in direction power when the operation direction of the pedal member changes from the stepping-in direction to the returning direction.

4. The pedal reaction force applying device according to claim 1, wherein the reaction force controller in a gradual manner performs the switching from the returning direction power to the stepping-in direction power when the operation direction of the pedal member changes from the returning direction to the stepping-in direction.

5. The pedal reaction force applying device according to claim 1, wherein the pedal member is configured to be set at its original position after the returning operation, the pedal reaction force applying device further comprising an original position determiner configured to determine whether the pedal member is returned to the original position, wherein
    the initialization condition that defines an end of a duration in which the stepping-in direction power is maintained is established when the original position determiner determines that the pedal member is returned to a vicinity of the original position.

6. The pedal reaction force applying device according to claim 1, further comprising an operation amount acquirer configured to acquire an operation amount of the pedal member, wherein
    the operation direction determiner determines the operation direction of the pedal member based on a temporal change characteristic related to the operation amount of the pedal member acquired by the operation amount acquirer.

7. A pedal reaction force applying device comprising:
    a pedal member provided to a vehicle and operable for a driver to perform a stepping-in operation in which the pedal member is operated in a stepping-in direction and a returning operation in which the pedal member is operated in a returning direction;
    an actuator configured to generate a power as a pedal reaction force applied to the pedal member in the stepping-in operation and the returning operation of the pedal member;
    a power transmitting device including a speed-reduction mechanism and provided between the pedal member and the actuator to transmit the power of the actuator to the pedal member via the speed-reduction mechanism;
    an operation direction determiner configured to determine whether an operation direction of the pedal member is the stepping-in direction or the returning direction;
    a reaction force controller configured to control the pedal reaction force, wherein
    the reaction force controller controls a magnitude of the pedal reaction force by controlling the power of the actuator based on the operation direction of the pedal member determined by the operation direction determiner; and
    an operation amount acquirer configured to acquire an operation amount of the pedal member, wherein
    the operation direction determiner determines that the operation direction of the pedal member is switched, when a change direction of the operation amount of the pedal member acquired by the operation amount acquirer is inverted and a variation related to the operation amount of the pedal member after the inversion becomes larger than a predetermined first variation threshold.

8. A pedal reaction force applying device comprising:

a pedal member provided to a vehicle and operable for a driver to perform a stepping-in operation in which the pedal member is operated in a stepping-in direction and a returning operation in which the pedal member is operated in a returning direction;

an actuator configured to generate a power as a pedal reaction force applied to the pedal member in the stepping-in operation and the returning operation of the pedal member;

a power transmitting device including a speed-reduction mechanism and provided between the pedal member and the actuator to transmit the power of the actuator to the pedal member via the speed-reduction mechanism;

an operation direction determiner configured to determine whether an operation direction of the pedal member is the stepping-in direction or the returning direction;

a reaction force controller configured to control the pedal reaction force, wherein the reaction force controller controls a magnitude of the pedal reaction force by controlling the power of the actuator based on the operation direction of the pedal member determined by the operation direction determiner; and an operation amount acquirer configured to acquire an operation amount of the pedal member, wherein the operation direction determiner determines that the operation direction of the pedal member is switched, when a temporal variation related to the operation amount of the pedal member acquired by the operation amount acquirer becomes less than a predetermined second variation threshold.

9. The pedal reaction force applying device according to claim 1, wherein the pedal member is configured to be set at its original position after the returning operation, and the power transmitting device comprises:

an actuator arm connected to the speed-reduction mechanism to transmit the power of the actuator to the pedal member; and a biasing member configured to bias the actuator arm in a direction of returning the pedal member to the original position, the power of the actuator is set based on at least one of a traveling state and a traveling condition of the vehicle, and the reaction force controller controls the power such that the power becomes a value other than zero over a predetermined time even when a command value related to the power of the actuator changes from a value other than zero to zero.

* * * * *